(12) United States Patent
Robertson et al.

(10) Patent No.: US 10,487,446 B2
(45) Date of Patent: Nov. 26, 2019

(54) FRONTAL POLYMERIZATION FOR FIBER-REINFORCED COMPOSITES

(71) Applicant: The Board of Trustees of the University of Illinois, Urbana, IL (US)

(72) Inventors: Ian D. Robertson, Champaign, IL (US); Jeffrey S. Moore, Savoy, IL (US); Nancy R. Sottos, Champaign, IL (US); Scott R. White, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 357 days.

(21) Appl. No.: 15/462,458

(22) Filed: Mar. 17, 2017

(65) Prior Publication Data
US 2018/0230642 A1 Aug. 16, 2018

Related U.S. Application Data

(60) Provisional application No. 62/310,422, filed on Mar. 18, 2016.

(51) Int. Cl.
| | |
|---|---|
| *D06M 15/227* | (2006.01) |
| *C08G 61/08* | (2006.01) |
| *C08K 5/50* | (2006.01) |
| *C08J 5/24* | (2006.01) |
| *D03D 15/00* | (2006.01) |

(52) U.S. Cl.
CPC ......... *D06M 15/227* (2013.01); *C08G 61/08* (2013.01); *C08J 5/24* (2013.01); *C08K 5/50* (2013.01); *C08G 2261/3325* (2013.01); *C08G 2261/418* (2013.01); *C08J 2333/08* (2013.01); *C08J 2345/00* (2013.01); *D03D 15/0011* (2013.01); *D10B 2101/08* (2013.01); *D10B 2101/12* (2013.01); *D10B 2101/20* (2013.01)

(58) Field of Classification Search
CPC ................ D06M 15/227; C08G 61/08; C08G 2261/3325; C08G 2261/418; C08J 5/24; C08K 5/50; D03D 15/0011; D10B 2101/08; D10B 2101/12; D10B 2101/20
See application file for complete search history.

(56) References Cited

U.S. PATENT DOCUMENTS

| | | | |
|---|---|---|---|
| 5,840,238 A | 11/1998 | Setiabudi et al. | |
| 5,855,837 A | 1/1999 | Scranton et al. | |
| 6,020,443 A | 2/2000 | Woodson et al. | |

(Continued)

OTHER PUBLICATIONS

Ruiu et al. "Advances in front ring opening metathesis polymerization of dicyclopentadiene" (2014).*

(Continued)

*Primary Examiner* — Austin Murata
(74) *Attorney, Agent, or Firm* — Haukaas Fortius PLLC; Michael H. Haukaas (57) ABSTRACT

Polydicyclopentadiene (PDCPD) is a polymer of growing importance in industrial applications. Frontal ring-opening metathesis polymerization (FROMP) offers a means to rapidly cure PDCPD with minimal input energy owing to a propagating reaction wave sustained by the exothermic polymerization. The disclosure provides methods for the rapid fabrication of fiber reinforced composites that is less restrictive and more energy efficient than conventional methods.

19 Claims, 6 Drawing Sheets

(56) References Cited

U.S. PATENT DOCUMENTS 6,815,517 B2 11/2004 Bürgel et al.
2017/0233538 A1* 8/2017 Drozdzak Matusiak ............... C08L 23/20
523/209

OTHER PUBLICATIONS

Bantreil, Xavier et al., "Mixed N-Heterocyclic Carbene/Phosphite Ruthenium Complexes: Towards a New Generation of Olefin Metathesis Catalysis," Chem. Commun., 2010, 46, 7115-7117.

Kessler, M.R. et al., "Cure Kinetics of the Ring-Opening Metathesis Polymerization of Dicyclopentadiene," Journal of Polymer Science: Part A: Polymer Chemistry, vol. 40, 2002, 2373-2383.

Kim, Cheol et al., "The Continuous Curing Process for Thermoset Polymer Composites. Part 1: Modeling and Demonstration," Journal of Composite Materials, vol. 29, No. 9, 1995, 1222-1252.

Leitgeb, Anita et al., "Two Commercially Available Initiators for the Retarded Ring-Opening Metathesis Polymerization of Dicyclopentadiene," Monatsh Chem, 2014, 145, 1513-1517.

Mariani, Alberto et al., "Frontal Ring-Opening Metathesis Polymerization of Dicyclopentadiene," Macromolecules, 2001, 34, 6539-6541.

Pojman, JA, Polymer Science: A Comprehensive Reference, 2012, vol. 4, pp. 957-980, Amsterdam: Elsevier BV.

Robertson, Ian D. et al., "Frontal Ring-Opening Metathesis of Exo-Dicyclopentadiene for Low Catalyst Loadings," ACS Macro Lett., 2016, 5, 593-596.

Robertson, Ian D. et al., "Rapid Stiffening of a Microfluidic Endoskeleton via Frontal Polymerization," Applied Materials & Interfaces, 2014, 6, 18469-18474.

Ruiu, Andrea et al., "Advances in the Frontal Ring Opening Metathesis Polymerization of Dicyclopentadiene," Journal of Polymer Science, Part A: Polymer Chemistry, 2014, 52, 2776-2780.

Schmid, Thibault E. et al., "Phosphites as Ligands in Ruthenium-Benzylidene Catalysts for Olefin Metathesis," Chem. Commun., 2011, 47, 7060-7062.

Szalay, Judit et al., "Conductive Composites Prepared via a Propagating Polymerization Front," Die Angewandte Makromolekulare Chemie, 236, 1996, 97-109.

Washington, Randy P. et al., "Frontal Polymerization Synthesis of Temperature-Sensitive Hydrogels," J. Am. Chem. Soc., 2001, 123, 7933, 7934.

\* cited by examiner

FRONTAL POLYMERIZATION FOR FIBER-REINFORCED COMPOSITES

RELATED APPLICATIONS

This application claims priority under 35 U.S.C. § 119(e) to U.S. Provisional Patent Application No. 62/310,422, filed Mar. 18, 2016, which is incorporated herein by reference.

GOVERNMENT SUPPORT

This invention was made with government support under Grant No. N0004-13-1-0170 awarded by the Office of Naval Research and Grant Nos. FA9550-15-1-0087 and FA9550-16-1-0017 awarded by the Air Force Office of Scientific Research. The government has certain rights in the invention.

BACKGROUND OF THE INVENTION

Preparation techniques of fiber composites commonly involve initially infiltrating a woven fabric of structural fibers, such as glass or carbon, with a reactive monomer solution. Then, the infiltrated fabric is placed in an oven, hot press, or autoclave to raise the temperature of the part to fully cure the product and maximize its mechanical properties.

One significant disadvantage of this process is the lengthy fabrication. For thick composite parts, curing can require greater than 8 hrs. Furthermore, the energy required to heat the composite during that time is considerable, increasing the overall cost of fabrication. Large ovens and autoclaves are required, which further increases cost.

Continuous curing uses a propagating curing reaction to reduce fabrication time and minimize the occurrence of thermal spiking during cure. (*Journal of Reinforced Plastics and Composites* 1993, 12 (5), 520-535.) However, in earlier examples of continuous curing, epoxy laminates had to be applied one at a time as they were frontally cured perpendicular to the fabric to prevent the reaction from being quenched. The curing process also limited the parts to either flat or cylindrical geometries to allow for laminates to be applied one layer at a time. Furthermore, the front was slow to propagate at less than 1 cm/min.

Accordingly, there is a need for a cost effective and rapid method of curing layered woven fabrics into composites of any desired geometry or shape.

SUMMARY

The invention provides a method for fabricating a fiber composite, the method comprising:
  a) stacking one or more layers of a fabric;
  b) suffusing the fabric with a mixture comprising a reactive monomer, a catalyst, and an optional catalytic inhibitor to extend the gelation time of the mixture, wherein the mixture is capable of frontal polymerization;
  c) shaping the fabric into one or more dimensions;
  d) contacting the suffused fabric with a thermal stimulus at one or more loci on the fabric that is sufficient in duration to trigger frontal polymerization, and discontinuing the thermal stimulus after frontal polymerization is triggered; and
  e) allowing frontal polymerization originating from the loci of thermal contact to propagate parallel to the fabric to cure the fiber composite;
  wherein frontal polymerization propagates a self-sustaining exothermic polymerization wave with a frontal velocity of greater than 1 cm/min, thereby producing a cured fiber-reinforced composite that has been shaped into one or more dimensions.

This disclosure also provides a method to extend the pot life of a mixture, the method comprising:
  a) mixing a trialkylphosphite inhibitor with a ruthenium catalyst to form a pre-catalyst complex, wherein the amount of inhibitor ranges from about 0.1 equivalents to about 10 equivalents of inhibitor based on the moles of ruthenium catalyst; and
  b) adding the pre-catalyst to a reactive olefin to form a mixture capable of ring opening metathesis polymerization (ROMP), or frontal ring opening metathesis polymerization (FROMP);
  wherein the mixture of pre-catalyst and olefin has a pot life that can be extended by a multiplication factor of up to about 200 by varying the amount of trialkylphosphite inhibitor added to the mixture.

Another embodiment of this disclosure provides a method for rapidly fabricating a shaped carbon fiber composite, the method comprising:
  a) stacking one or more layers of a carbon fiber fabric;
  b) suffusing the fabric with a mixture comprising about 1M to about 10 M of dicyclopentadiene (DCPD), about 10 ppm to about 500 ppm of dichloro[1,3-bis(2,4,6-trimethylphenyl)-2-imidazolidinylidene](benzylidene)(tricyclohexylphosphine)ruthenium(II) (GC2), and about 0.05 equivalents to about 10 equivalents of tri-n-butyl phosphite based on the moles of GC2;
  c) shaping the fabric into one or more dimensions;
  d) contacting the suffused fabric with a thermal stimulus at one or more loci on the fabric that is sufficient in duration to trigger frontal polymerization, and discontinuing the thermal stimulus after frontal polymerization is triggered; and
  e) allowing frontal polymerization originating from the loci of thermal contact to propagate parallel to the fabric to cure the fiber composite;
  wherein frontal polymerization propagates a self-sustaining exothermic polymerization wave with a frontal velocity of greater than 1 cm/min, thereby producing a cured fiber-reinforced composite that has been shaped into one or more dimensions.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION

Autocatalytic reactions are widely used as a means of amplifying small physical or chemical stimuli to engender substantial change in material structure or function. Such self-propagating reactions, including combustion, base proliferation, frontal polymerization, and others, are therefore advantageous for use in the chemical field because of their low energy requirements, because the initial stimulus is the only requisite input energy. Frontal polymerizations are a useful class of autocatalytic system that rapidly transform monomer to polymer upon a small thermal stimulus. The stimulus activates a latent initiator to begin an exothermic polymerization reaction that activates a further latent initiator and ultimately produces a propagating exothermic reaction wave that quickly polymerizes available monomer. Frontal polymerizations are of particular interest because they engender a useful transformation of physical properties. The invention described herein provides methods to enhance the control of these reactions to provide a useful product such as a fiber-reinforced composite.

Figure 1:
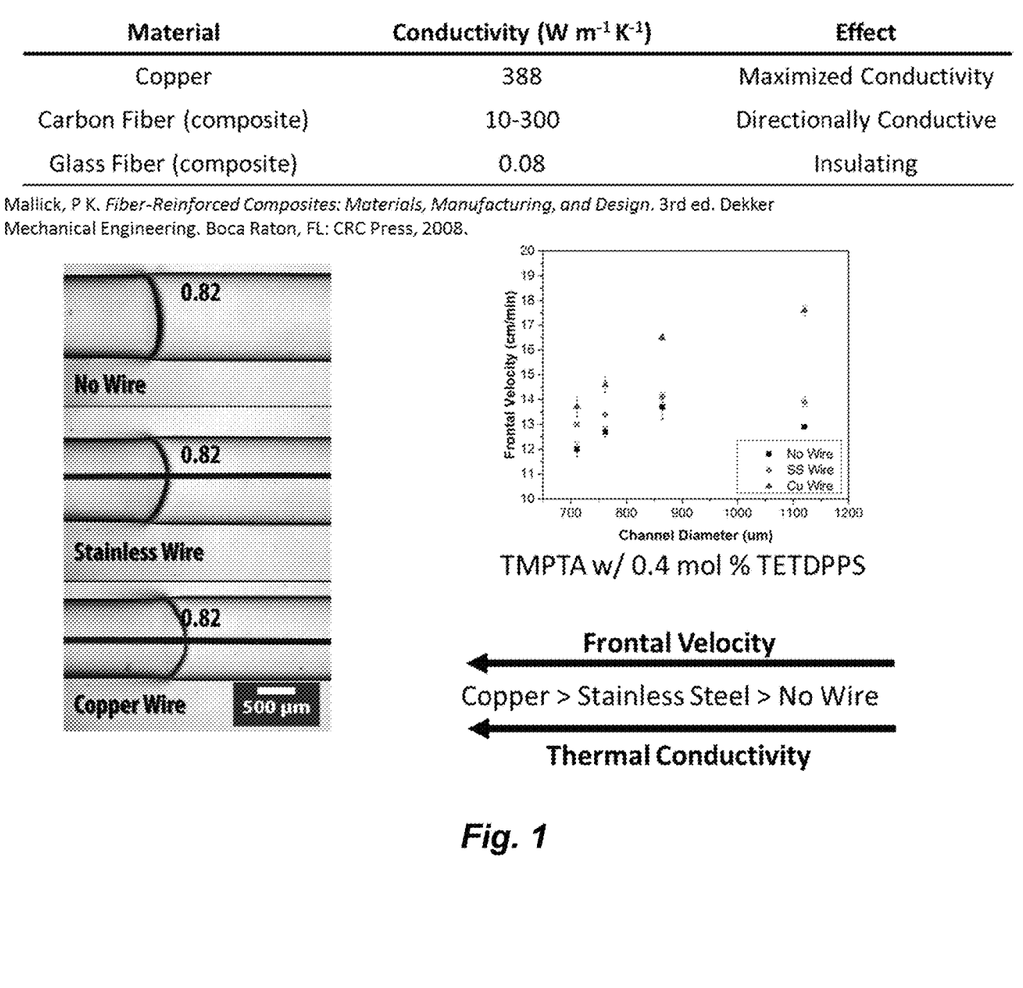
FIG. 1. Evidence for assistance of thermally conductive fibers in frontal polymerization (FP) curing.

FIG. 1 is a model system we developed for a composite to compare how the thermal conductivity of a metal filament inside a microchannel affects frontal velocity. Frontal polymerization is triggered at one end of the microchannel and propagates along its length. Micro-channels were tested with metals of different thermal conductivity, for example, stainless steel filaments (low conductivity) and copper filaments (high conductivity). Filaments with a higher thermal conductivity significantly accelerated frontal velocity. A 40% acceleration was produced by copper filaments. This is due to a preheating effect, whereby the thermally conductive filament conducts heat from behind the front (ca. 10° C.) to unpolymerized monomer ahead of the front. This preheating accelerates the polymerization kinetics and, thus, the front.

A similar effect is observed in carbon fiber composites, where propagation is accelerated in the direction of the carbon fibers. For example, we observed the front travels about twice as fast parallel to the fibers as opposed to across them. Part of this is related to the directional thermal conductivity of the carbon fibers. Because of their chemical structure, carbon fibers are significantly more conductive along their length than across their width.

Faster frontal velocities result in faster production of composites. Also, thermal preheating enables the use of higher fiber volume content in the composite with less risk of quenching the front from heat loss.

Figure 2:
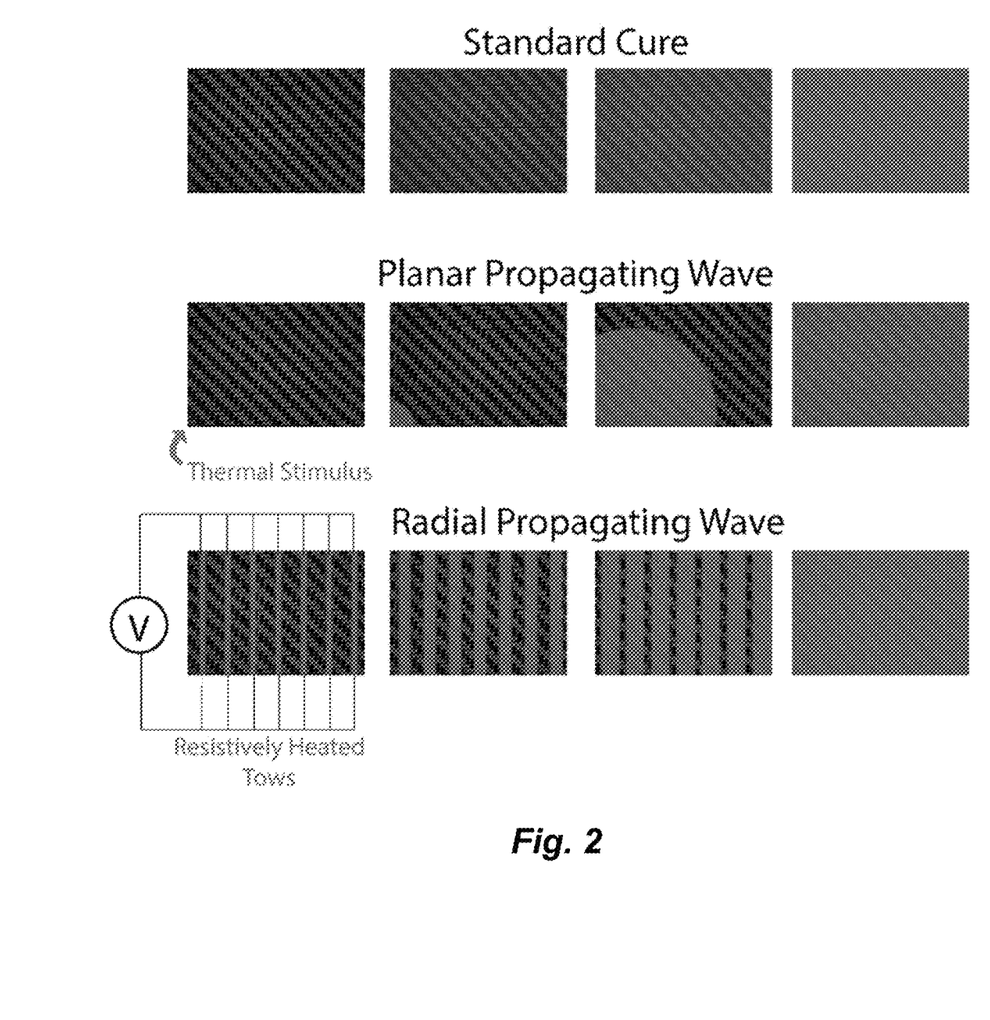
FIG. 2. Diagrams for conventional curing, single point initiated FP curing, and multi-point initiated FP curing.

This disclosure provides a method for rapid polymerization of fiber-reinforced composite, wherein, for example, a woven fabric of carbon or glass fiber is suffused with a latent solution of monomer and initiator and, in contrast to standard curing procedures, can be triggered via either a single local thermal stimulus, or a number of resistively heated tows to begin a propagating wave of exothermic polymerization (FIG. 2). This frontal polymerization propagates parallel to the fabric to produce a fiber-reinforce composite material very quickly.

Figure 3:
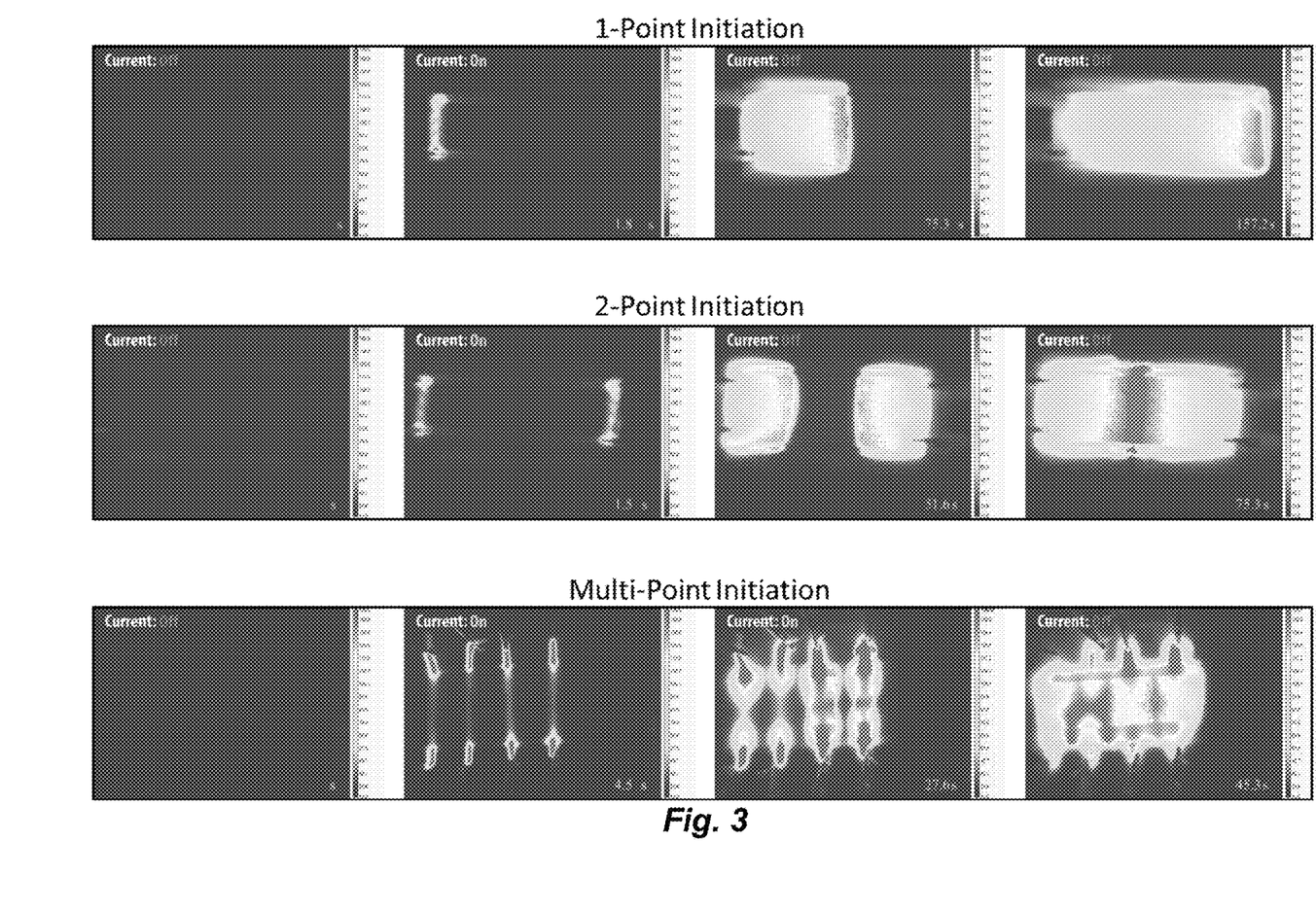
FIG. 3. Still images of videos showing rapid transformation, visual and thermal.

In the present disclosure, more reactive chemistry is used, so the propagating polymerization waves travel at rates of many cm/min, allowing for much faster curing than conventional methods and previous continuous curing techniques. Compared to conventional curing, which can take about 8 hours, planar frontal curing with a single initiation point can take a few minutes, while initiation via multiple resistively heated tows can effect curing in seconds (FIG. 3).

In addition, other than the minor initiating stimulus, thermal energy is derived from the exothermic reaction of the monomer components instead of a continuous external supply. This eliminates the need for bulky and expensive heating equipment to effect curing. The highly reactive chemistry also enables propagation parallel to the fiber weave instead of perpendicular to it. Thus, fiber layups can be cured after being assembled instead of requiring a layer-by-layer assembly during the curing process. This removes the limitation on part shape. Experiments show that deformation of the weave prior to curing does not inhibit propagation. The methods described herein allow curing of fiber reinforced composites in a matter of minutes to seconds using minimal input energy compared to conventional methods.

Frontal curing allows for fiber-reinforced composites to be cured with minimal input energy and in a short time. Using a single initiation point, a 1×1 m composite panel can be cured in less than 10 minutes. If multiple initiation points are used, curing can be accomplished in seconds. As the thermal triggering for this process can be accomplished with a small power source, no ovens or large equipment are required.

Figure 4:
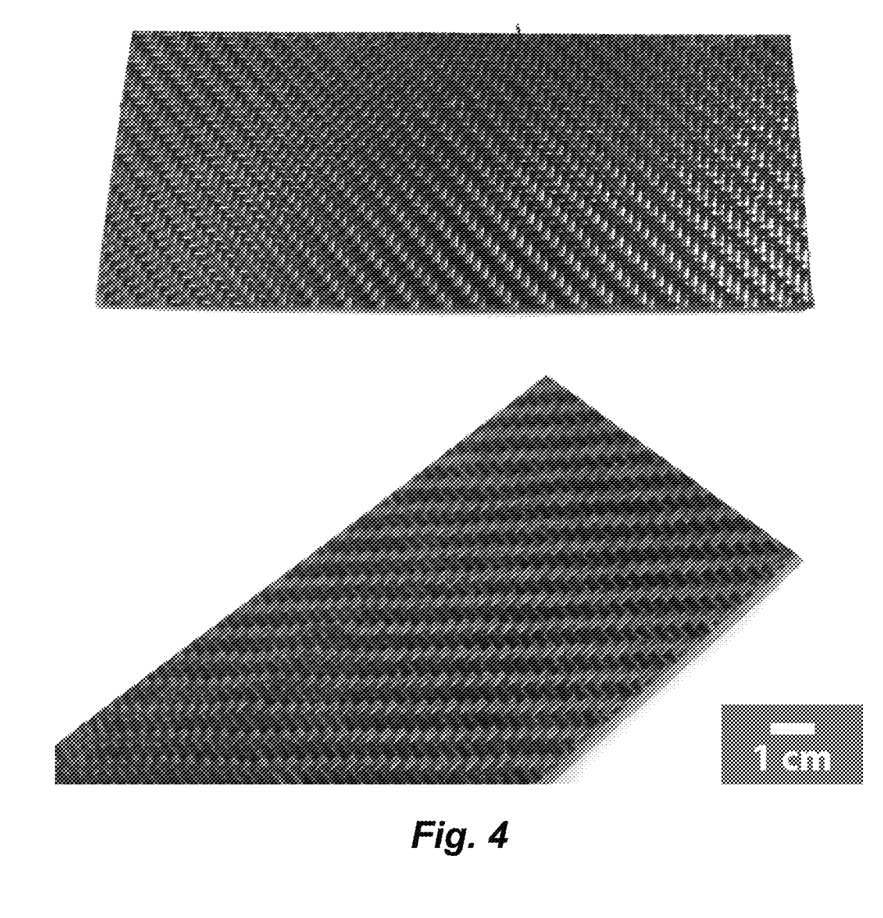
FIG. 4. Images of frontally polymerized PDCPD/carbon fiber composite. Endo-DCPD with 50 ppm GC2 (1-point resistive initiation).

One of the main challenges in performing frontal curing of a fiber composite is finding a highly reactive monomer composition that can frontally polymerize into a polymer suitable as a matrix material. Polydicyclopentadiene (PDCPD) is a material of growing importance in the fabrication of durable parts due to its low density; high toughness, impact strength, and stiffness; and chemical resistance. These qualities make it well-suited as a matrix material for fiber-reinforced composites (FIG. 4). PDCPD can be synthesized by frontal ring-opening metathesis polymerization (FROMP) of dicyclopentadiene (DCPD) using a ruthenium catalyst in the presence of inhibitor to control the rate of reaction propagation. One of the principal limitations of FROMP chemistry has been the short pot life of the system. Previous examples of FROMP have used known ROMP inhibitors to extend the working time and enable FROMP of the solution. In the first demonstration of FROMP, Mariani et al. used triphenyl phosphine as the inhibitor of first generation Grubbs' catalyst in DCPD, affording a pot life of ca. 1 minute at room temperature. (*Macromolecules* 2001, 34 (19), 6539) For FROMP to occur, the solution had to be flash-frozen and the reaction performed on the solid monomer, which would be non-ideal for processing large components. More recently, the more strongly coordinating 4-dimethylaminopyridine (DMAP) was used to extend the pot life to nearly 30 minutes. (*J. Polym. Sci. Part A: Polym. Chem.* 2014, 52 (19), 2776) However, when DMAP was used with the more reactive exo-dicyclopentadiene monomer, the pot life was only ca. 10 minutes. (*ACS Macro Lett.* 2016, 5 (5), 593-596) Limonene was also used to retard reaction by forming a less active intermediate complex which extended the pot life to nearly an hour, but reduced the stiffness of the resulting polymer. (*J. Polym. Sci. Part A: Polym. Chem.* 2015, 54 (1), 63-68.)

A longer pot-life is desirable in applications requiring the liquid monomer solution to persist for >1 hour while maintaining the mechanical integrity of the resulting polymer, such as the processing of fiber-reinforced composites. Previously explored FROMP inhibitors such as DMAP and triphenylphosphine were drawn from literature where catalytic activity was reduced towards moderately strained olefins at low concentration and room temperature. The environment in a FROMP reaction is substantially different. The catalyst is dissolved in a 7.4M solution of highly strained olefin that reaches ca. 200° C. at the front. As such, FROMP inhibitors may need to bind to ruthenium with a much higher affinity than those explored so far to engender an extended pot life.

Recently, Cazin et al. have shown that by replacing $Cy_3P$ in a ruthenium-benzylidene or ruthenium-indenylidine Grubbs-type complex with an alkyl phosphite ligand, reactivity towards strained olefins such as DCPD at room temperature can be suppressed, while maintaining efficient reactivity at high temperatures. (*Monatsh Chem* 2014, 145 (9), 1513-1517; *Monatsh Chem* 2015, 146 (7), 1043-1052.) Herein, we demonstrate that in an analogous method, alkyl phosphites can be used as inhibitors for Grubbs' $2^{nd}$ generation catalyst (GC2) in FROMP, thereby increasing pot life by up to 160×, while still allowing frontal polymerization at relatively high frontal velocities Scheme 1. Inhibition of Grubbs' $2^{nd}$ generation ruthenium catalyst by alkyl phosphites produces stable solutions with endo-DCPD for >30h at r.t. while able to be completely polymerizes at anytime via FROMP.

Stable for >30h at r.t.

Alkyl-phosphites are relatively unexplored as ligands in ROMP applications, likely due to the strength of the phosphite-ruthenium interaction, which nearly halts reaction at room temperature. Alkyl phosphites are known to bind strongly to ruthenium despite their π acidity due to enhanced backbonding by the metal. Recent work has shown that phosphites attached to metals also ligated to an N-heterocyclic carbine exhibit a synergistic bonding effect, whereby the phosphite-metal interaction is further strengthened. Cazin et al. (*Chem. Commun.* 2010, 46 (38), 7115-7117) have shown that replacing the tricyclohexyl-phosphine in a ruthenium-benzylidene or ruthenium-indenylidine complex with an alkyl phosphite can substantially reduce activity towards strained olefins such as DCPD at room temperature. However, at high temperatures, the reaction proceeds quickly and efficiently. At room temperature, the dissociation of phosphite is highly unfavorable, which slows initiation by DCPD.

Even if metathesis begins, free phosphite can re-coordinate to the metal center and hinder further reaction. At high temperature, increased entropic effects favor phosphite dissociation and enable ROMP to proceed with minimal hindrance. Hence, we aimed to achieve a similar result by adding the phosphite ligand to the dicyclopentadiene monomer as an inhibitor for commercially available GC2. Since DCPD is known to displace the tricyclohexylphosphine ligand and begin polymerization quickly after mixing, the dissolved phosphite will be able to coordinate to the active catalyst and form a latent precatalyst complex in situ (Scheme 2). Using phosphite as an inhibitor rather than as a ligand allows for control of the inhibitor's concentration in order to adjust its effect on the FROMP reaction.

Scheme 2. Upon initiation of GC2 with DCPD, free phosphite can coordinate to Ru and prevent further reaction at room temperature.

Three trialkyl phosphites were tested at a range of concentrations to explore their effects on frontal velocity and pot life. We chose to use a 100 ppm concentration of GC2 in DCPD in all cases to evaluate the effectiveness of the inhibitors.

The pot life of a frontal polymerization (FP) reaction is the point at which FP will no longer occur due to decomposition or reaction of the reagents. In FROMP, the pot life is a result of either rapid-exothermic polymerization or gelation of the material, after which processing is difficult. None of the alkyl phosphite inhibited samples exhibited rapid exothermic polymerization in our experiments. Pot lives were dramatically increased even with concentrations of phosphite substantially less than 1 eq. to catalyst. Furthermore, the polymerization was slowed so much at room temperature that in some cases FROMP could be performed hours after full gelation of the monomer. Since it was difficult to determine a specific time at which FROMP was no longer possible, we decided to use the time at which the mixture gelled as a measure of pot life. The gel point was determined via rheology, and the time at which it was reached in isothermal measurements will be referred to as the gel time.

Figure 5:
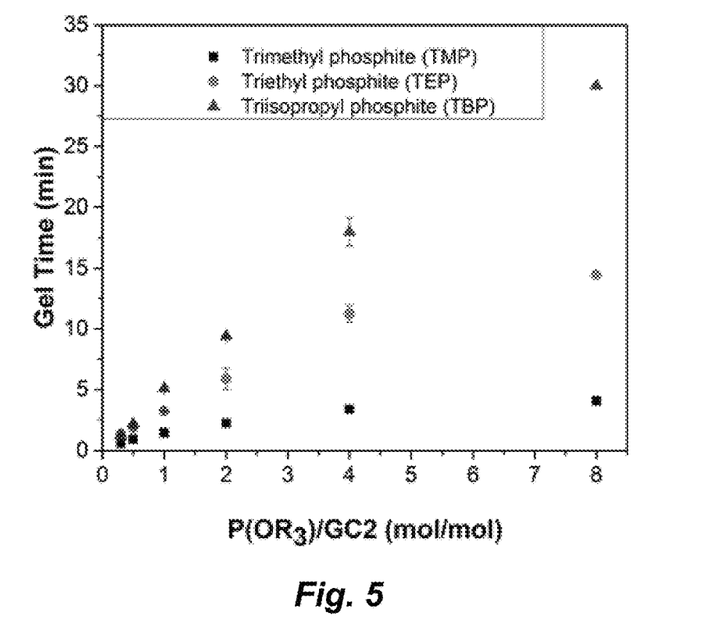
FIG. 5. Effect of alkyl phosphite inhibitors on gel time of FROMP solutions. TBP exhibits the greatest effect, followed by TEP, followed by TMP.

In all cases, gel time increased as inhibitor concentration increased (FIG. 5). All three of the tested phosphites dramatically improved the pot life of the system. However, despite their structural similarity, the chosen alkyl phosphites inhibited polymerization to different degrees. Samples inhibited with TBP exhibited the greatest effect. Even with 0.3 eq. TBP, the gel time was extended by 6-fold to ca. 1 h. At 8 eq. TBP, the gel time was over 30 h. TEP samples showed less of an effect. Samples with 0.3 eq. TEP also gelled in ca. 1 h, but 8 eq., TEP samples gelled in 14 hours. TMP showed the least effect, with 0.3 eq. samples gelling in 35 min and 8 eq. samples gelling in 4 h.

Figure 6:
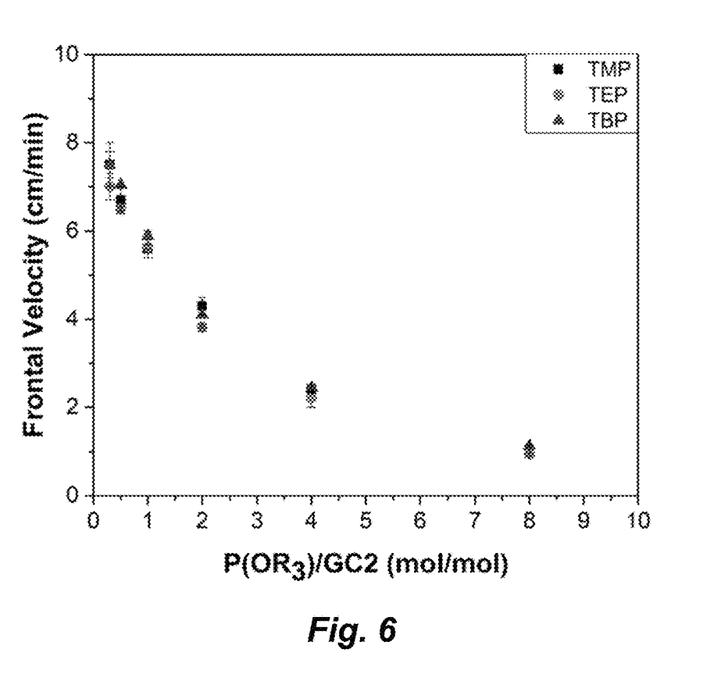
FIG. 6. Effect of each alkyl phosphite on frontal velocity. While all tested phosphites slow frontal velocity, the effects are similar for all three compared to the disparity in the gel times.

Frontal velocity shows an inverse trend to pot life; greater quantities of inhibitor correspondingly reduce frontal velocity (FIG. 6). However, the magnitude of reduction in frontal velocity is significantly smaller than the magnitude of the increase in pot life. The addition of 1 eq. trimethylphosphite (TMP) reduced the frontal velocity by ca. 45% while 1 eq. TBP only reduced frontal velocity by ca. 40% (FIG. 6). The pot lives of these systems were increased by 8× and 24×, respectively. This difference in magnitude is attributable to low concentration of inhibitor in the solution coupled to the highly temperature-sensitive formulation. At room temperature phosphite can readily bind to active catalyst, deactivating them before much polymerization has occurred. However, at high temperature, the polymerization rate is so high and the reaction duration so short that there is a low probability of inhibitor binding after polymerization is initiated.

Figure 7:
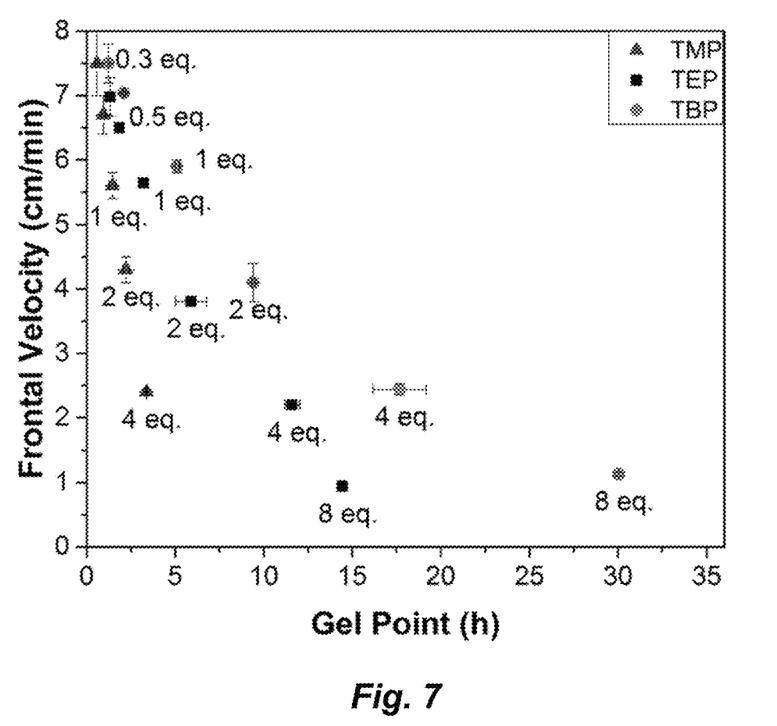
FIG. 7. Comparison of frontal velocity to gel time shows tributyl phosphite to allow greater pot life while minimally affecting frontal velocity.

A plot of frontal velocity vs. gel time can be used to compare the overall effectiveness of the phosphite inhibitors (FIG. 7). Ideally, the pot-life and frontal velocity should be maximized, so the closer to the top-right corner of the plot a sample is, the better its performance. As shown in FIG. 7, TBP samples exhibit greater pot-lives than the other phosphites. The TMP samples exhibit the worst performance, and the TEP samples are in between. As the steric properties of these ligands are very similar (Tolman cone angle between 107°-109°), the observed disparity in inhibitor potency is likely the result of an electronic effect that either affects metal binding or stability in solution.

Hence, a small quantity of inhibitor can so drastically reduce catalyst activity. We propose that the initiation rate of GC2 in DCPD is quite small at room temperature, however, GC2 is so active with DCPD and has such a low rate of termination that a small quantity of active catalyst can gel the entire solution relatively quickly. When GC2 initiates chain growth in the presence of phosphite, it is quickly "capped" by free phosphite to produce less active precatalyst that can still undergo ROMP at high temperatures. Thus, even with less than 1 eq. inhibitor the pot life can be extended substantially by suppressing initial chain growth.

Figure 8:
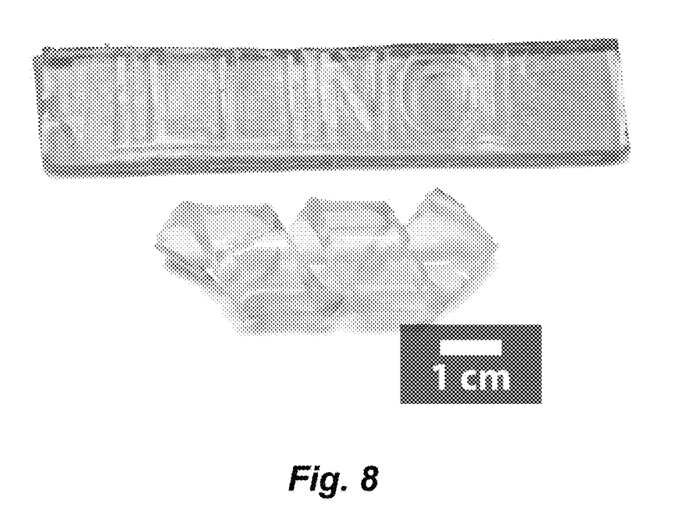
FIG. 8. Examples of gelled materials that have been patterned or deformed, which can be subsequently frontally polymerized to fully cure the material.

The remarkable performance of alkyl-phosphite inhibitors toward extending pot life allows for new FROMP-based processing methods. As mentioned previously, FROMP can still be performed after full gelation of the DCPD solution, and the gelled material is stable for several hours at room temperature. We took advantage of this stability by partially curing a solution of 50 ppm GC2 in DCPD with 2 eq. TEP for 18 hours to produce a highly flexible freestanding DCPD organogel. By DSC analysis we confirmed that only 30% of the monomer needed to polymerize to form the gel; thus, the gel still contained sufficient reactive monomer to perform FP. The partial reaction of the DCPD prior to initiation reduces frontal velocity by ca. 25%, but does not prevent propagation. We observed that the gel could be deformed or patterned and subsequently frontally polymerized to fully cure the material them in <1 minute. (FIG. 8). Furthermore, the gels were stable for >6 months at −20° C. with no reduction in frontal velocity. This suggested it would be possible to fabricate pre-preg composite laminates that can be frontally polymerized, which could enhance the ease of application for manufacturing companies.

In conclusion, this disclosure describes the use of inexpensive and readily available alkyl phosphites to improve the pot life of catalyst/DCPD solutions by up to 150× while facilitating FROMP at high frontal velocities. The combination of high reactivity and extended pot life thus enables the rapid preparation of carbon fiber composites also disclosed herein. By varying phosphite concentration we can fully control the gel time from 1-35 hours, which is an order of magnitude longer than previous FROMP chemistries. The increased gelation time allows for extended processing of liquid DCPD/catalyst solutions as well as the FROMP of a free-standing gel for the first time. The high inhibition efficiency will enable FROMP of other highly reactive monomers to reduce the concentration of catalyst necessary for FROMP, and enable FROMP for manufacturing vacuum assisted resin transfer molding (VARTM) infused laminates and pre-pregs.

Definitions

The following definitions are included to provide a clear and consistent understanding of the specification and claims. As used herein, the recited terms have the following meanings. All other terms and phrases used in this specification have their ordinary meanings as one of skill in the art would understand. Such ordinary meanings may be obtained by reference to technical dictionaries, such as *Hawley's Condensed Chemical Dictionary* 14$^{th}$ Edition, by R. J. Lewis, John Wiley & Sons, New York, N.Y., 2001.

References in the specification to "one embodiment", "an embodiment", etc., indicate that the embodiment described may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect or connect such aspect, feature, structure, moiety, or characteristic with other embodiments, whether or not explicitly described.

The singular forms "a," "an," and "the" include plural reference unless the context clearly dictates otherwise. Thus, for example, a reference to "a compound" includes a plurality of such compounds, so that a compound X includes a plurality of compounds X. It is further noted that the claims may be drafted to exclude any optional element. As such, this statement is intended to serve as antecedent basis for the use of exclusive terminology, such as "solely," "only," and the like, in connection with any element described herein, and/or the recitation of claim elements or use of "negative" limitations.

The term "and/or" means any one of the items, any combination of the items, or all of the items with which this term is associated. The phrases "one or more" and "at least one" are readily understood by one of skill in the art, particularly when read in context of its usage. For example, the phrase can mean one, two, three, four, five, six, ten, 100, or any upper limit approximately 10, 100, or 1000 times higher than a recited lower limit.

As will be understood by the skilled artisan, all numbers, including those expressing quantities of ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements. When values are expressed as approximations, by use of the antecedent "about," it will be understood that the particular value without the modifier "about" also forms a further aspect.

The terms "about" and "approximately" are used interchangeably. Both terms can refer to a variation of ±5%, ±10%, ±20%, or ±25% of the value specified. For example, "about 50" percent can in some embodiments carry a variation from 45 to 55 percent, or as otherwise defined by a particular claim. For integer ranges, the term "about" can include one or two integers greater than and/or less than a recited integer at each end of the range. Unless indicated otherwise herein, the terms "about" and "approximately" are intended to include values, e.g., weight percentages, proximate to the recited range that are equivalent in terms of the functionality of the individual ingredient, composition, or embodiment. The terms "about" and "approximately" can also modify the end-points of a recited range as discussed above in this paragraph.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. It is therefore understood that each unit between two particular units are also disclosed. For example, if 10 to 15 is disclosed, then 11, 12, 13, and 14 are also disclosed, individually, and as part of a range. A recited range (e.g., weight percentages or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents. It will be further understood that the endpoints of each of the ranges are significant both in relation to the other endpoint, and independently of the other endpoint.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, for use in an explicit negative limitation.

The term "contacting" refers to the act of touching, making contact, or of bringing to immediate or close proximity, including at the cellular or molecular level, for example, to bring about a physiological reaction, a chemical reaction, or a physical change, e.g., in a solution, in a reaction mixture, in vitro, or in vivo.

An "effective amount" refers to an amount effective to bring about a recited effect, such as an amount necessary to form products in a reaction mixture. Determination of an effective amount is typically within the capacity of persons skilled in the art, especially in light of the detailed disclosure provided herein. The term "effective amount" is intended to include an amount of a compound or reagent described herein, or an amount of a combination of compounds or reagents described herein, e.g., that is effective to form products in a reaction mixture. Thus, an "effective amount" generally means an amount that provides the desired effect.

The terms "inhibit", "inhibiting", and "inhibition" refer to the slowing, or halting, the progression of a chemical reaction. The inhibition can be greater than about 10%, 20%, 40%, 60%, 80%, 90%, 95%, or 99%, for example, compared to the reaction that occurs in the absence of inhibition.

The term "substantially" as used herein, is a broad term and is used in its ordinary sense, including, without limitation, being largely but not necessarily wholly that which is specified. For example, the term could refer to a numerical value that may not be 100% the full numerical value. The full numerical value may be less by about 1%, about 2%, about 3%, about 4%, about 5%, about 6%, about 7%, about 8%, about 9%, about 10%, about 15%, or about 20%.

The term "frontal polymerization" refers a process in which the polymerization reaction propagates through a vessel or a substance. There are three types of frontal polymerizations: thermal frontal polymerization (TFP) that uses an external energy source to initiate the front; photofrontal polymerization (PFP), in which the localized reaction is driven by an external UV source; and isothermal frontal polymerization (IFP), which relies on the Norrish-Trommsdorff, or gel effect, that occurs when monomer and initiator diffuse into a polymer seed (small piece of polymer).

Thermal frontal polymerization begins when a heat source contacts a solution of monomer and a thermal initiator or catalyst. Alternatively, a UV source can be applied if a photoinitiator is also present. The area of contact (or UV exposure) has a faster polymerization rate, and the energy from the exothermic polymerization diffuses into the adjacent region, raising the temperature and increasing the reaction rate in that location. The result is a localized reaction zone that propagates down the reaction vessel as a thermal wave.

The term "ring-opening metathesis polymerization (ROMP)" refers to a type of olefin metathesis chain-growth polymerization that produces industrially important products. The driving force of the reaction is relief of ring strain in cyclic olefins (e.g. norbornene or cyclopentene). Thus, "frontal ring-opening metathesis polymerization (FROMP)" entails the conversion of a monomer into a polymer via a localized exothermic reaction zone that propagates through the coupling of thermal diffusion and Arrhenius reaction kinetics. The pot-life, get-time, and reaction kinetics can be controlled through various modifications of the polymerization chemistry.

The term "suffuse" refers to spreading through or over, for example, spreading a mixture of reactive chemicals throughout a fabric such that the mixture baths and permeates into the weave and fibers of the fabric.

The term "stack" or "stacking" refers to neatly arranging a number of objects on top of one another into a pile. For example, several fabric layers can be placed on top of each other in an orderly arrangement.

The terms "pot life" and "working life" are often taken to mean the same thing for mixtures comprising reactive monomers. Pot-life is the amount of time between the mixing of monomer and initiator and the point at which frontal polymerization is no longer possible. It can also refer to the amount of time it takes for an initial mixed viscosity to double, or quadruple for lower viscosity products. Timing starts from the moment the product is mixed, and is measured at room temperature. Working life, refers to the amount of time a mixture remains low enough in viscosity that it can still be easily applied to a part or substrate in a particular application. For that reason, working life can vary from application to application, and even by the application method of the reactive mixture. Pot life can act as a guide in determining working life by providing a rough timeline of viscosity growth.

The terms "gel time" is another term that is often used interchangeably with "pot life". Both terms are used to describe the thickening of a reactive monomer mixture. Gel time is determined by observing when it starts to become stringy, or gel-like, though not quite fully cured. This value can be useful for manufacturing purposes if one needs to move a part before the cure is complete, but does not want any shift in a component placement. In this disclosure gel time refers to the point at which the shear storage modulus becomes greater than shear loss modulus during an oscillating rheometry experiment at 23° C.

Embodiments of the Invention

This disclosure describes an embodiment of a method for fabricating a fiber composite, the method comprising: a) stacking one or more layers of a fabric; b) suffusing the fabric with a mixture comprising a reactive monomer, a catalyst, and an optional catalytic inhibitor to extend the gelation time of the mixture, wherein the mixture is capable of frontal polymerization; c) shaping the fabric into one or more dimensions; d) contacting the suffused fabric with a thermal stimulus at one or more loci on the fabric that is sufficient in duration to trigger frontal polymerization, and discontinuing the thermal stimulus after frontal polymerization is triggered; and e) allowing frontal polymerization originating from the loci of thermal contact to propagate parallel to the fabric to cure the fiber composite; wherein frontal polymerization propagates a self-sustaining exothermic polymerization wave with a frontal velocity of greater than 1 cm/min, thereby producing a cured fiber-reinforced composite that has been shaped into one or more dimensions.

In various embodiments, the monomer comprises trimethylolpropane triacrylate (TMPTA), a norbornene, endo-dicyclopentadiene (DCPD), oxo-DCPD, or an epoxy resin. In additional embodiments, the catalyst comprises a radical initiator, or a ruthenium catalyst. One embodiment of the radical initiator comprises, but is not limited to, trihexyltetralecylphosphonium persulfate (TETDPPS). Embodiments of the ruthenium catalyst comprises, but is not limited to dichloro[1,3-bis(2,4,6-trimethylphenyl)-2-imidazolidinylidene](benzylidene)(tricyclohexylphosphine)ruthenium(II) (GC2), dichloro[1,3-bis(2,4,6-trimethylphenyl)-2-imidazolidinylidene](indenylidene)(tricyclohexylphosphine)ruthenium(II), or dichloro[1,3-bis(2,4,6-trimethylphenyl)-2-imidazolidinylidene](indenylidene)(triisopropylphosphite) ruthenium(II).

Additional embodiments of the catalyst include amine curatives, such as, but not limited to aliphatic amities. Some examples include, but are not limited to triethylamine, diethylamine, triethylenetetramine (TETA), isophorone diamine, or diethylaminetriamine (DETA).

In various other embodiments, the fabric comprises a weave of a carbon fiber, a glass fiber, a polymer fiber, a ceramic fiber, a steel fiber, or a copper fiber. In other embodiments, the polymer fiber can be various polyaramids, or various ultra-high molecular weight polyethylenes (UH-MWPE). In additional embodiments, the fiber is directionally thermally conductive (FIG. 1). In some embodiments, the fiber weave can be a plain weave, or a twill weave.

In various other embodiments of this disclosure, the mixture of monomer and catalyst comprises a catalytic inhibitor. Various embodiments of the catalytic inhibitor comprise dimethylaminopyridine, triphenyl phosphine, tricyclohexyl phosphine, trimethyl phosphite, triethyl phosphite, tripropyl phosphite, triisopropyl phosphite, tri-n-butyl phosphite, tri-sec-butyl phosphite, tri-tert-butyl phosphite, or triisobutyl phosphite.

In some other embodiments, the catalytic inhibitor comprises limonene, an alkylaminopyridine, an alkylphosphine, or an alkylphosphite. In more specific embodiments, the alkylphosphite is trimethyl phosphite, triethyl phosphite, tripropyl phosphite, triisopropyl phosphite, tri-n-butyl phosphite, tri-sec-butyl phosphite, tri-tert-butyl phosphite, or triisobutyl phosphite.

In yet other embodiments, the alkylphosphite is present in about 0.05 equivalents to about 10 equivalents, based on the moles of the ruthenium catalyst added. Based on the moles of the ruthenium catalyst added, the alkylphospite can also be present in about 0.5 equivalents to about 5 equivalents, about 0.1 equivalents, about 0.2 equivalents, about 0.3 equivalents, about 0.4 equivalents, about 1 equivalents, about 2 equivalents, about 3 equivalents, about 4 equivalents, about 5 equivalents, about 8 equivalents, or about 15 equivalents, in various other embodiments.

In additional embodiments, the alkylphosphite extends the gelation time, or extends the pot life of the monomer and catalyst mixture by about 0.1 hours to about 40 hours, about 0.5 hours to about 30 hours, or about 1 hour to about 24 hours. In yet other embodiments, the concentration of the inhibitor reduces the frontal polymerization velocity by about 5% to about 95%, about 1% to about 80%, about 10% to about 70%, or about 10% to about 50%.

In various other embodiments, the thermal stimulus comprises one or more heating elements contacting less than the whole fabric, or one or more pairs of electrodes affixed to opposing ends of one or more, but not all fiber tows in the fabric, wherein a current passing through the electrodes raises the temperature in the fiber tows by resistive heating. In other embodiments, the thermal stimulus can be triggered at one or more points, or one or more areas under the fabric layers to cure through the thickness of the laminate.

In additional embodiments, the thermal stimulus temperature ranges from about 50° C. to about 400° C., or about 100° C. to about 350° C. In other embodiments, the thermal stimulus is discontinued less than about 1 minute, or less than about 10 minutes after frontal polymerization is triggered. In yet other embodiments, the thermal stimulus temperature ranges from about 50° C. to about 400° C., and the thermal stimulus is discontinued less than about 5 minutes after frontal polymerization is triggered.

In other embodiments, frontal velocity is greater than about 1 cm/min, greater than about 5 cm/min, greater than about 10 cm/min, greater than about 20 cm/min, or greater than about 50 cm/min.

In various embodiments, the fabric is suffused with monomer solution for more than 5 seconds, more than about 10 seconds, more than about 1 minute, more than about 10 minutes, or more than about 20 minutes, then excess solution is removed before shaping, or during shaping, of the fabric.

In an embodiment of the disclosure to extend the pot life of a mixture, the method comprises: a) mixing a trialkylphosphite inhibitor with a ruthenium catalyst to form a pre-catalyst complex, wherein the amount of inhibitor ranges from about 0.1 equivalents to about 10 equivalents of inhibitor based on the moles of ruthenium catalyst; and b) adding the pre-catalyst to a reactive olefin to form a mixture capable of ring opening metathesis polymerization (ROMP), or frontal ring opening metathesis polymerization (FROMP); wherein the mixture of pre-catalyst and olefin has a pot life that can be extended by a multiplication factor of up to about 200 by varying the amount of trialkylphosphite inhibitor added to the mixture.

This disclosure includes embodiments of composition, the composition comprising: a trialkylphosphite inhibitor with a ruthenium catalyst to form a pre-catalyst complex, wherein the amount of inhibitor ranges from about 0.1 equivalents to about 10 equivalents of inhibitor based on the moles of ruthenium catalyst.

Other embodiments of the composition comprise about 1M to about 10 M of dicyclopentadiene (DCPD; an endo-isomer, exo-isomer, or combination thereof), about 10 ppm to about 500 ppm of dichloro[1,3-bis(2,4,6-trimethylphenyl)-2-imidazolidinylidene](benzylidene)(tricyclohexylphosphine)ruthenium(II) (GC2), and about 0.1 equivalents to about 5 equivalents of tri-n-butyl phosphite based on the moles of GC2.

This disclosure also includes a method for rapidly fabricating a shaped carbon fiber composite, the method comprising: a) stacking one or more layers of a carbon fiber fabric; b) suffusing the fabric with a mixture comprising about 1M to about 10 M of dicyclopentadiene (DCPD), about 10 ppm to about 500 ppm of dichloro[1,3-bis(2,4,6-trimethylphenyl)-2-imidazolidinylidene](benzylidene)(tricyclohexylphosphine)ruthenium(II) (GC2), and about 0.1 equivalents to about 5 equivalents of tri-n-butyl phosphite based on the moles of GC2; c) shaping the fabric into one or more dimensions; d) contacting the suffused fabric with a thermal stimulus at one or more loci on the fabric that is sufficient in duration to trigger frontal polymerization, and discontinuing the thermal stimulus after frontal polymerization is triggered; and e) allowing frontal polymerization originating from the loci of thermal contact to propagate parallel to the fabric to cure the fiber composite; wherein frontal polymerization propagates a self-sustaining exothermic polymerization wave with a frontal velocity of greater than 1 cm/min, thereby producing a cured fiber-reinforced composite that has been shaped into one or more dimensions.

The following Examples are intended to illustrate the above invention and should not be construed as to narrow its scope. One skilled in the art will readily recognize that the Examples suggest many other ways in which the invention could be practiced. It should be understood that numerous variations and modifications may be made while remaining within the scope of the invention.

EXAMPLES

Example 1

The concept of thermoset frontal polymerization through a woven carbon fiber matrix has been demonstrated using two distinct chemistries for this process. One is the radical-based FP of a triacrylate, and the other is the ruthenium catalyzed FP of dicyclopentadiene. By using a highly reactive isomer of DCPD, we have been able to reduce the quantity of ruthenium required for curing to cost-effective levels. We have used both single point initiation via a point heat source, and multipoint initiation via resistively heated carbon fiber tows to activate the curing process.

Multiple 3×6" and 4×8" panels have been cured in this way using two separate chemistries to fabricate these frontally polymerized fiber reinforced composites. Other chemistries can be amenable to this technique. The described approach is broadly applicable to several highly reactive polymerizations such as accelerated epoxy polymerization.

Carbon Fiber Frontal Polymerization Technique

Acrylate Reaction with point initiation. A reactive acrylate solution prepared from 10 mL trimethylolpropane triacrylate (TMPTA) (inhibitor free) was mixed with 100 mg trihexyltetradecylphosphonium persulfate (TETDPPS). The solution was degassed for 5 min under vacuum. This solution was stable for about 1 hour at room temperature (Scheme 3).

Scheme 3. Structures of TMPTA and TETDPPS.

TMPTA

TETDPPS

Carbon Fiber Layup. A sheet of Toray T300 carbon fiber 2×2 twill weave was cut into 3 pieces of equal size, ca. 5×10 cm. The pieces were stacked and thermal tape was applied to the edges to hold the sheets together. The TMPTA/TETDPPS solution was applied to the upper surface of the weave stack and allowed to soak in for ca. 30 s. The stack was then compressed with a roller and the excess monomer solution was wiped away. Then, the impregnated weave can be bent or twisted into the desired shape.

Frontal Curing. A soldering iron (ca. 300° C.) was applied to one corner of the impregnated weave. A propagating exothermic reaction wave spreads out from the contact point at ca. 20 cm/min, ultimately curing the entire part. The reaction wave has been characterized by IR imaging to be ca. 200° C. The resulting composite was stiff.

Dicyclopentadiene (DCPD) Reaction with Resistive Initiation

A reactive DCPD solution was prepared from 4 mg of $2^{nd}$ generation Grubbs catalyst (GC2), mixed with 2.3 mg dimethylaminopyridine inhibitor, and dissolved in 500 L toluene. This solution was left to equilibrate for about 5 minutes. This catalyst solution was then added to 10 g DCPD with 5 wt. % tricyclopentadiene. This solution was stable for about 15 minutes at room temperature (Scheme 4).

Carbon Fiber Layup. A sheet of Toray T300 carbon fiber 2×2 twill weave was cut into 6 pieces of equal size, ca. 6×15 cm. The pieces were stacked and thermal tape was applied to the edges to hold the sheets together. The DCPD/catalyst solution was applied to the upper surface of the weave stack and pressed into the fibers with a rolling tool. Then impregnated weave can be bent or twisted into the desired shape.

Frontal Curing. Alligator clip electrodes were attached to both sides of one or both ends of the sample. Care was taken to make sure clips on the same end were touching the same fiber tows. Approximately 5V of DC current was applied, causing the conductive tows to rise to ca. 80° C. via resistive heating. After the Front had initiated, the current was switched off.

FROMP Curing of DCPD Infused Carbon Fiber Laminate with Resistive Initiation in VARTM A reactive DCPD solution was prepared from 50 mg of $2^{nd}$ generation Grubbs catalyst (GC2), dissolved in 1.5 mL N-methylpyrollidone. This catalyst solution was then added to 150 g DCPD with 5 wt. % 5-ethylidene norbornene. The completed solution had 50 ppm catalyst in DCPD. This solution was stable for about 15 minutes at room temperature. Optionally, phosphite inhibitor can be added to extend the processing window (Scheme 4).

Scheme 4. Structures of GC2 and DCPD.

$2^{nd}$ Generation Grubbs Catalyst

Dicyclopentadiene

Carbon Fiber Layup. A sheet of Toray T300 carbon fiber 2×2 twill weave is cut into 12 pieces of equal size, ca. 4×8 in. The pieces are stacked and a resistive heating element (nichrome wire) is placed between layers 6 and 7 on one end. The laminate is laid up for vacuum assisted resin transfer molding (VARTM) and infused with the DCPD/GC2 solution.

Frontal Curing. Current from a controlled voltage source is passed through the resistive heating element to heat the material inside the laminate. Upon reaching the triggering temperature (ca. 80° C.) the frontal polymerization is initiated and the current may be switched off. Depending on the formulation and thickness of the laminate, frontal speeds may vary, but are typically between 2 and 6 cm/min.

FROMP Curing of Carbon Fiber Pre-preg with DCPD/Catalyst/Inhibitor

A reactive DCPD solution was prepared from 100 mg $2^{nd}$ generation Grubbs catalyst, dissolved in 3.0 mL phenylcyclohexane. Since the fiber impregnation requires greater than 30 minutes to complete, an inhibitor was required to maintain monomer stability. A preferred volume of 15-30 μL tributylphosphite (TBP) was added to the catalyst solution. This catalyst/inhibitor solution was then added to 150 g DCPD with 5 wt. % 5-ethylidene norbornene. The completed solution had 100 ppm catalyst and 50-100 ppm TBP in DCPD. This solution was stable for about 1-2 hours at room temperature (Scheme 5).

Scheme 5. Structures of GC2, DCPD, and TBP.

2nd Generation
Grubbs Catalyst

Dicyclopentadiene (R = Bu)
Tributylphosphite

Carbon Fiber Pre-Impregnation. A spool of Toray T300 Carbon Fiber which dispenses a single tow was passed through a series of pre-tensioners and a resin bath containing a reactive DCPD solution. The impregnated tow was then wound onto a cylinder that was continuously translated perpendicular to the fiber during the winding process. The result was a band of unidirectional carbon fiber impregnated with the reactive DCPD solution. This band was removed from the cylinder and cut into segments for lamination. The application of pressure merged the carbon fiber plies together so that curing could take place.

Frontal Curing. A soldering iron (ca. 300° C.) was applied to one point of the pre-preg laminate. A propagating exothermic reaction wave spread out from the contact point at ca. 4 cm/min, ultimately curing the entire part. Notably, the reaction propagated much faster parallel to the fibers rather than perpendicular to them.

Example 2

DCPD exists as either the endo or exo stereoisomer (Scheme 6). Since nearly all commercially available DCPD is in the endo form, several examples of FROMP have focused on this isomer. Exo-DCPD has some advantageous properties compared to endo-DCPD (Table 1). For example, exo-DCPD undergoes ROMP at a significantly higher rate than the endo-isomer at room temperature. In FROMP, a monomer with a higher polymerization rate would require less catalyst to achieve the same rate of monomer conversion and heat release. Thus, lowering the catalyst concentration is possible while still facilitating rapid FROMP and forming a mechanically robust, cross-linked thermoset similar to poly-(endo-DCPD).

Scheme 6. Structures of endo-DCPD and exo-DCPD.

endo            exo

TABLE 1

Comparison between the Properties of endo- and exo-DCPD Illustrating the FROMP Advantages of exo-DCPD.

| Property | endo-DCPD | exo-DCPD |
|---|---|---|
| $\Delta G^\ddagger$ for ROMP (kJ/mol) | 82 | 74 |
| Melting point (° C.) | 32 | −40 |
| Rate coefficient for retro Diels-Alder reaction at ca. 200° C. ($10^4$ $s^{-1}$) | 19.6 | 0.947 |

In summary, frontal ring opening metathesis polymerization (FROMP) has great potential for use in rapid fabrication of structural materials, such as carbon fiber composite materials that can be pre-shaped into a desired geometry prior to curing. However, the high activity of the ruthenium catalyst used for FROMP has limited the working time to <30 min before polymer gelation. We report the use of alkyl phosphites as inhibitors for Grubbs' type catalysts to substantially extend working time. The identity of the alkyl phosphite is shown to impact both frontal velocity and rheology during cure. By controlling phosphite chemistry and concentration, we were able to control gelation time between 0.25 and 35 h while still allowing FROMP at high frontal velocities and producing fully cured thermoset polymers. These results will be useful for rapid manufacturing using FROMP as well as more conventional ROMP synthesis.

While specific embodiments have been described above with reference to the disclosed embodiments and examples, such embodiments are only illustrative and do not limit the scope of the invention. Changes and modifications can be made in accordance with ordinary skill in the art without departing from the invention in its broader aspects as defined in the following claims.

All publications, patents, and patent documents are incorporated by reference herein, as though individually incorporated by reference. No limitations inconsistent with this disclosure are to be understood therefrom. The invention has been described with reference to various specific and preferred embodiments and techniques. However, it should be understood that many variations and modifications may be made while remaining within the spirit and scope of the invention.

What is claimed is:
1. A method for fabricating a fiber composite, the method comprising:
   a) stacking one or more layers of a fabric;
   b) suffusing the fabric with a mixture comprising a reactive monomer, a catalyst, and an optional catalytic inhibitor to extend the gelation time of the mixture, wherein the mixture is capable of frontal polymerization;

c) shaping the fabric into one or more dimensions;

d) contacting the suffused fabric with a thermal stimulus at one or more loci on the fabric that is sufficient in duration to trigger frontal polymerization, and discontinuing the thermal stimulus after frontal polymerization is triggered; and e) allowing frontal polymerization originating from the loci of thermal contact to propagate parallel to the fabric to cure the fiber composite;

wherein frontal polymerization propagates a self-sustaining exothermic polymerization wave with a frontal velocity of greater than 1 cm/min, thereby producing a cured fiber-reinforced composite that has been shaped into one or more dimensions.

2. The method of claim 1 wherein the monomer comprises trimethylolpropane triacrylate (TMPTA), a norbornene, endo-dicyclopentadiene (DCPD), exo-DCPD, or an epoxy resin.

3. The method of claim 1 wherein the catalyst comprises a radical initiator, or a ruthenium catalyst.

4. The method of claim 3 wherein the radical initiator comprises trihexyltetradecylphosphonium persulfate (TET-DPPS).

5. The method of claim 3 wherein the ruthenium catalyst comprises dichloro[1,3-bis(2,4,6-trimethylphenyl)-2-imidazolidinylidene](benzylidene)(tricyclohexylphosphine)ruthenium (II) (GC2), dichloro[1,3-bis(2,4,6-trimethylphenyl)-2-imidazolidinylidene](indenylidene)(tricyclohexylphosphine)ruthenium(II), or dichloro[1,3-bis(2,4,6- trimethylphenyl)-2-imidazolidinylidene](indenylidene)(triisopropylphosphite)ruthenium(II).

6. The method of claim 1 wherein the fabric comprises a weave of a carbon fiber, a glass fiber, a polymer fiber, a ceramic fiber, a steel fiber, or a copper fiber.

7. The method of claim 6 wherein the fiber is directionally thermally conductive.

8. The method of claim 1 wherein the mixture of monomer and catalyst comprises a catalytic inhibitor.

9. The method of claim 8 wherein the catalytic inhibitor comprises dimethylaminopyridine, triphenyl phosphine, tricyclohexyl phosphine, trimethyl phosphite, triethyl phosphite, tripropyl phosphite, triisopropyl phosphite, tri-n-butyl phosphite, tri-sec-butyl phosphite, tri-tert-butyl phosphite, or triisobutyl phosphite.

10. The method of claim 8 wherein the catalytic inhibitor comprises limonene, an alkylaminopyridine, an alkylphosphine, or an alkylphosphite.

11. The method of claim 10 wherein the alkylphosphite is trimethyl phosphite, triethyl phosphite, tripropyl phosphite, triisopropyl phosphite, tri-n-butyl phosphite, tri-sec-butyl phosphite, tri-tert-butyl phosphite, or triisobutyl phosphite.

12. The method of claim 11 wherein the alkylphosphite is present in about 0.1 equivalents to about 10 equivalents, based on the moles of the ruthenium catalyst added.

13. The method of claim 11 wherein the alkylphosphite extends the gelation time of the monomer and catalyst mixture by about 0.1 hours to about 40 hours.

14. The method of claim 11 wherein the concentration of the inhibitor reduces the frontal polymerization velocity by about 5% to about 95%.

15. The method of claim 1 wherein the thermal stimulus comprises one or more heating elements contacting less than the whole fabric, or one or more pairs of electrodes affixed to opposing ends of one or more, but not all fiber tows in the fabric, wherein a current passing through the electrodes raises the temperature in the fiber tows by resistive heating.

16. The method of claim 15 wherein the thermal stimulus temperature ranges from about 50° C. to about 400° C., the thermal stimulus is discontinued less than about 1 minute after frontal polymerization is triggered, or a combination thereof.

17. The method of claim 1 wherein the frontal velocity is greater than 5 cm/min.

18. The method of claim 1 wherein the fabric is suffused with monomer solution for more than 5 seconds, then excess solution is removed before shaping, or during shaping, of the fabric.

19. A method for rapidly fabricating a shaped carbon fiber composite, the method comprising:

a) stacking one or more layers of a carbon fiber fabric;

b) suffusing the fabric with a mixture comprising about 1M to about 10 M of dicyclopentadiene (DCPD), about 10 ppm to about 500 ppm of dichloro[1,3-bis(2,4,6-trimethylphenyl)-2-imidazolidinylidene](benzylidene)(tricyclohexylphosphine)ruthenium(II) (GC2), and about 0.1 equivalents to about 5 equivalents of tri-n-butyl phosphite based on the moles of GC2;

c) shaping the fabric into one or more dimensions;

d) contacting the suffused fabric with a thermal stimulus at one or more loci on the fabric that is sufficient in duration to trigger frontal polymerization, and discontinuing the thermal stimulus after frontal polymerization is triggered; and e) allowing frontal polymerization originating from the loci of thermal contact to propagate parallel to the fabric to cure the fiber composite;

wherein frontal polymerization propagates a self-sustaining exothermic polymerization wave with a frontal velocity of greater than 1 cm/min, thereby producing a cured fiber-reinforced composite that has been shaped into one or more dimensions.

* * * * *